United States Patent [19]

Oda et al.

[11] 4,372,938

[45] Feb. 8, 1983

[54] PRODUCING SULFUR TETRAFLUORIDE USING AMINE/HYDROGEN FLUORIDE COMPLEX

[75] Inventors: Yoshio Oda; Hiroshi Otouma, both of Yokohama; Keiichi Uchida, Kawasaki; Shinsuke Morikawa, Yokohama; Masaaki Ikemura, Yokohama, all of Japan

[73] Assignee: Asahi Glass Company Ltd., Tokyo, Japan

[21] Appl. No.: 370,670

[22] Filed: Apr. 22, 1982

Related U.S. Application Data

[63] Continuation-in-part of Ser. No. 196,655, Oct. 14, 1980, abandoned.

[30] Foreign Application Priority Data

Oct. 12, 1979 [JP] Japan .................................. 54-130833
Aug. 1, 1980 [JP] Japan .................................. 55-105115
Aug. 12, 1980 [JP] Japan .................................. 55-109808

[51] Int. Cl.$^3$ ...................... C01B 17/45; C10B 17/00
[52] U.S. Cl. .................................................. 423/469
[58] Field of Search ........................................ 423/469

[56] References Cited

U.S. PATENT DOCUMENTS

2,992,073 7/1961 Tullock ................................ 423/469
3,950,498 4/1976 Appel .................................. 423/469
4,082,839 4/1978 Elbeck ................................ 423/469

FOREIGN PATENT DOCUMENTS

2363679 7/1975 Fed. Rep. of Germany ...... 423/469
3038404 4/1981 Fed. Rep. of Germany ...... 423/469

OTHER PUBLICATIONS

Olah, et al., *Inorganic Chemistry*, vol. 16, Oct. 1977, p. 2637.

*Primary Examiner*—Brian E. Hearn
*Attorney, Agent, or Firm*—Oblon, Fisher, Spivak, McClelland & Maier

[57] ABSTRACT

A process for producing sulfur tetrafluoride comprises reacting in the absence or presence of a solvent an amine/hydrogen fluoride complex having the formula:

$$Am \cdot (HF)_n$$

wherein Am represents an amine selected from the group consisting of nitrogen-containing heterocyclic aromatic amines and derivatives thereof, and n represents 2-4, with sulfur dichloride, sulfur monochloride or a combination of chlorine and sulfur at a temperature of 0° to 60° C., the molar ratio of said amine/hydrogen fluoride complex to said sulfur dichloride, sulfur monochloride or sulfur being represented by the formula:

$$\frac{B}{n \times A} > 0.5$$

wherein n is as defined above, A represents moles of sulfur in said sulfur dichloride, sulfur monochloride or sulfur, and B represents moles of said amine/hydrogen complex.

10 Claims, No Drawings

PRODUCING SULFUR TETRAFLUORIDE USING AMINE/HYDROGEN FLUORIDE COMPLEX

This application is a continuation in part of Ser. No. 196,655 filed Oct. 14, 1980, now abandoned.

BACKGROUND OF THE INVENTION

1. Field of the Invention

The present invention relates to a process for producing sulfur tetrafluoride. More particularly, it relates to a process for producing sulfur tetrafluoride by using an amine/hydrogen fluoride complex.

2. Description of the Prior Art

Various processes for producing sulfur tetrafluoride have been proposed. One of these processes is a process for reacting sodium fluoride with sulfur dichloride in acetonitrile, as disclosed in U.S. Pat. No. 2,992,073. In this process, the operation for the reaction in the uniform condition is not easy because sodium fluoride as the starting material and sodium chloride as the by-product are solid, whereby an yield of sulfur tetrafluoride is highly fluctuated depending upon particle size of sodium fluoride and it is difficult to recover sodium fluoride from sodium chloride as the by-product.

Another known process is a process for reacting sulfur dichloride with chlorine and hydrogen fluoride without using any catalyst as disclosed in West German Unexamined patent publication No. 2,363,679. In this process, the reaction should be performed at a low temperature of lower than −50° C.

The other known process is a process for using NOF as a fluorinating agent for sulfur chloride as disclosed in U.S. Pat. No. 4,082,839. In this process, it is not easy to treat the corrosive NOF and it provides only low yield of sulfur tetrafluoride. Because of these reasons, any processes are not satisfactory as an industrial process.

SUMMARY OF THE INVENTION

It is an object of the present invention to provide a process for producing sulfur tetrafluoride in high yield of sulfur tetrafluoride by a simple operation for the reaction in capable of recycling the reaction medium which can be employed as an industrial process.

The foregoing and other objects of the present invention have been attained by providing a process for producing sulfur tetrafluoride which comprises reacting in the absence or presence of a solvent an amine/hydrogen fluoride complex having the formula:

$$Am.(HF)_n$$

wherein Am represents an amine selected from the group consisting of tertiary aliphatic amines and nitrogen-containing heterocyclic aromatic amines and derivatives thereof, and n represents 2–4, with sulfur dichloride, sulfur monochloride or a combination of chlorine and sulfur at a temperature of 0° to 60° C., the molar ratio of said amine/hydrogen fluoride complex to said sulfur dichloride, sulfur monochloride or sulfur being represented by the formula:

$$\frac{B}{n \times A} > 0.5$$

wherein n is as defined above, A represents moles of sulfur in said sulfur dichloride, sulfur monochloride or sulfur, and B represents moles of said amine/hydrogen fluoride complex.

DETAILED DESCRIPTION OF THE PREFERRED EMBODIMENTS

A process for producing $SF_4$ by fluorinating sulfur dichloride with pyridine/hydrogen fluoride complex has been reported in Inorg. Chem. 16(10), 2637 (1977). It has been found that in accordance with the process described in the prior art, $SF_4$ is not produced but only small amount of $SOF_2$ is produced. This process can not be a useful process for producing $SF_4$. The inventors have studied processes for effectively imparting the function of amines such as pyridine, picoline and quinoline and have found that $SF_4$ can be obtained in high yield by using the amine/hydrogen fluoride complex having relatively low content of hydrogen fluoride. It is considered that in the prior art process, $SF_4$ was not produced since the starting material $SCl_2$ etc. could not reach near pyridine because of the use of the complex of pyridine $(HF)_{9.5}$ having high content of HF, and the effective catalytic activity can not be imparted by pyridine.

In accordance with the process of the present invention, sulfur dichloride or a combination of sulfur monochloride or sulfur with chlorine is used as the sulfur compound used for fluorination. In the latter, it is considered that sulfur or sulfur monochloride is converted by chlorine into sulfur dichloride. Therefore, the process of the present invention will be illustrated by the example of the reaction of the amine/hydrogen fluoride complex with sulfur dichloride. In the process of the present invention, sulfur tetrafluoride ($SF_4$) is produced as shown by the reaction formulation.

$$3SCl_2 + 4Am.HF \rightarrow SF_4 + S_2Cl_2 + 4Am.HCl \tag{1}$$

(Am represents the amine)
The amine/hydrogen chloride complex (Am.HCl) as the by-product can be converted into $$Am.(HF)_m (m>5)$$

by removing HCl in a gas form by treating it with excess amount of hydrogen fluoride. Then, excess amount of hydrogen fluoride can be separated from the complex by a desired process to recover $Am.(HF)_n (n=2-4)$.

The amines used in the present invention are nitrogen-containing heterocyclic aromatic amines whose complexes with hydrogen fluoride are liquid at the reaction temperature. The nitrogen-containing heterocyclic aromatic compounds can be pyridine and quinoline or pyridine derivatives and quinoline derivatives having a $C_1$–$C_6$ alkyl group, a $C_1$–$C_6$ alkoxy group, halogen atom, hydroxyl group or nitro, group such as picoline.

The characteristic of the present invention is to use the amine/hydrogen fluoride complex which is capable of recycling for the reuse, as the reagent. In order to smoothly perform the reaction, it is also quite important that the molar ratio of the hydrogen fluoride component (HF) to the amine component (Am) of the amine/hydrogen fluoride complex used in the fluorination, ranges from 2 to 4. In order to effectively impart the catalytic action of Am, it is necessary to coordinate HF and $SCl_2$ with Am. The fluorination may be performed only after coordination of HF and $SCl_2$ with Am. Therefore, if excess HF is added to Am, Am is covered by HF to prevent the approach of $SCl_2$ to Am, whereby the reaction is substantially inhibited or is not performed. Thus, the fluorination is not substantially performed at a molar ratio of HF to Am of 5 or more to give remarkably low yield of sulfur fluoride.

On the other hand, if the molar ratio of HF to Am is less than 2, $Am.(HF)_n(n<2)$ tends to readily react with chlorine present in the reaction system to form a tar-like slurry whereby the precious amine will be wasted.

The optimal molar ratio of HF to Am to obtain high yield ranges from 2 to 3. In the present invention, it is also important that the molar ratio of the amine/hydrogen fluoride complex $(Am.(HF)_n)$ to the sulfur dichloride, sulfur monochloride or sulfur is in a certain specific relationship with the molar ratio of HF to Am. Namely, the relationship is represented by the following formula:

$$\frac{B}{n \times A} > 0.5$$

wherein n is the molar ratio of HF to Am and takes a value of from 2 to 4 as mentioned above, A represents moles of sulfur in said sulfur dichloride, sulfur monochloride or sulfur, and B represents moles of said amine/hydrogen fluoride complex. The ratio of the amine/hydrogen fluoride complex to the sulfur in the sulfur compound represented by the above formula is thus at least 0.5, preferably at least 1. If the ratio is less than 0.5, the yield tends to be poor. The upper limit is not critical. However, with an increase of the ratio represented by the above formula, the proportion of the amine/hydrogen fluoride complex relative to the sulfur compound increases, and consequently a greater amount of the complex will have to be recycled. Accordingly, for the practical purposes or for the economy of the operation, the upper limit of the ratio is usually about 10, preferably about 5.

The fluorination can be performed without any solvent. In order to smoothly perform the reaction, it is preferable to use the solvent.

The solvent can be any organic solvent being inert to the reagents such as hydrogen fluoride, chlorine, sulfur, sulfur dichloride or sulfur monochloride used in the reaction system. It is optimum to use halogenated hydrocarbons especially one or more of methylene chloride, chloroform, carbon tetrachloride, fluorotrichloromethane and trichlorotrifluoroethane. In view of a uniform reaction, an easy separation of the product and an easy control of the reaction temperature, it is preferable to perform the reaction in said solvent.

As a result of further studies of solvents, it is found that the use of the mixture of methylene chloride and trichlorotrifluoroethane as the mixed solvent is optimum from the following viewpoints.

In the reaction formulation (1), $S_2Cl_2$ and Am(HCl) complex as the by-products in the reaction system are in liquid forms. In order to effectively recover the amine (Am) recycled, it is preferable to completely separate $S_2Cl_2$ from Am(HCl) complex. For this purpose, it is optimum to use a mixed solvent of methylene chloride and trichlorotrifluoroethane, especially a mixed solvent of 20 to 80 mol % of methylene chloride and 80 to 20 mol % of trichlorotrifluoroethane. When a ratio of methylene chloride is too low, the reaction velocity is too low and certain trouble is caused in the industrial production and a solid material may formed to clog the apparatus. When a ratio of methylene chloride is too high, the by-products of $S_2Cl_2$ and Am(HCl) complex may not be easily separated each other. Both are not preferable.

When a mixed solvent of 30 to 70 mol % of methylene chloride and 70 to 30% of trichlorotrifluoroethane is used, the operation is smoothly carried out and the Am(HCl) layer is not substantially contaminated with $S_2Cl_2$ and the following recovering operation is easily performed. This is optimum.

The fluorination (1) in the solvent is essentially performed at a temperature of the solvent of 0° to 60° C. preferably 20° to 40° C. The reason is as follows. When the temperature is lower than 0° C., the reaction velocity is too low, whereas when the temperature is higher than 60° C., the decomposition of $SCl_2$ is easily caused. The reaction is usually performed under the atmospheric pressure, if necessary it can be performed under an elevated pressure. In view of the separation of the resulting $SF_4$, the reaction is preferably performed under an elevated pressure of lower than 10 kg./cm$^2$.

The relation of the amine and sulfur dichloride in the reaction using said solvent and said reaction temperature will be described.

The recycling step of the amine/hydrogen fluoride complex $Am.(HF)_n(n=2-4)$ will be described.

The amine/hydrogen chloride complex Am.HCl as the by-product in the reaction (1), can be converted into the amine/hydrogen fluoride complex by reacting hydrogen fluoride with it by the reaction formulation:

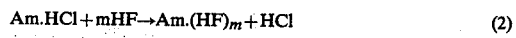

$$Am.HCl + mHF \rightarrow Am.(HF)_m + HCl \quad (2)$$

The reaction (2) is considered as the substitution of HCl by HF. The inventors have found that the conversion of the reaction is remarkably affected depending upon the molar ratio of hydrogen fluoride HF to the amine/hydrogen fluoride complex as m in $Am.(HF)_m$. In order to attain the conversion of 100% in the reaction (2), it is necessary to be $m \geq 6$. For example, in the case of m=4, the conversion is about 60% to remain about 40% of the unreacted Am.HCl.

In view of the above-mentioned fact, the amine/hydrogen fluoride complex $Am.(HF)_m$ obtained in the reaction (2) is the complex having $m \geq 6$. In order to use this complex in the fluorination of sulfur dichloride as the reaction (1), it is necessary to perform dehydrogen fluorination to convert the complex into $Am.(HF)_n$(n=1-4). The dehydrogen fluorination is performed as desired such as a distillation under a reduced pressure as shown by the reaction formulation to obtain the desired amine/hydrogen fluoride complex.

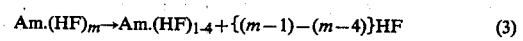

$$Am.(HF)_m \rightarrow Am.(HF)_{1-4} + \{(m-1)-(m-4)\}HF \quad (3)$$

The complex having n=3 or more can be obtained by a simple distillation under a reduced pressure. In order to obtain the amine/hydrogen fluoride complex having n=1-3, it is necessary to distil under a reduced pressure in the presence of sodium fluoride. The resulting $Am.(HF)_{1-4}$ can be used in the reaction (1) by the recycling and HF can be used in the reaction (2).

The present invention will be further illustrated by certain examples and references which are provided for purposes of illustration only and are not intended to be limiting the present invention.

TEST (EXAMPLE) 1

In a reactor containing 120 ml. of methylene chloride, 0.2 mole of sulfur dichloride $SCl_2$ was charged and the temperature of the solvent was kept at 30° C., and 0.92 mol of pyridine/hydrogen fluoride complex $Py.(HF)_3$ (molar ratio HF/Py of 3) was charged and the reaction was performed for 3 hours to obtain 0.18 mol of sulfur tetrafluoride. The yield was 90%.

The by-product, pyridine/hydrogen chloride complex Py.HCl was admixed with 8 equivalent times of hydrogen fluoride to perform dehydrogen chlorination of Py.HCl and to obtain pyridine/hydrogen fluoride complex $Py.(HF)_8$ in an yield of 100%.

$Py.(HF)_8$ was distilled under a reduced pressure to obtain $Py.(HF)_3$ in an yield of 100%.

TESTS (EXAMPLE) 2 TO 8 AND (REFERENCE) 9 to 12

In accordance with the process of Example 1 except varying the conditions as described in Table 1, each operation was carried out. The results are shown in Table 1 with the result of Example 1.

TESTS (EXAMPLE) 13 TO 15

In accordance with the process of Example 1 except varying the kind and the amount of the solvent and the kind of the amine, each operation was carried out to obtain sulfur tetrafluoride. The conditions and the results are shown in Table 2.

TESTS (EXAMPLE) 16 TO 17

In accordance with the process of Example 1 except varying the ratio of methylene chloride and trichlorotrifluoroethane used as the solvent, each operation was carried out. The conditions and results are shown in Table 2.

TESTS (EXAMPLE) 18 TO 24

Each operation was carried out in accordance with the process of Example 1 except that chlorine and sulfur monochloride or sulfur were used instead of sulfur dichloride. The conditions and results are shown in Table 3.

TESTS (REFERENCE) 25 TO 27

Each operation was carried out in accordance with the process of Example 1 except that sulfur and chlorine, or sulfur monochloride and chlorine were changed with pyridine/hydrogen fluoride complex Py.(HF). The conditions and results are shown in Table 4.

TABLE 1

| Test | 1 | 2 | 3 | 4 | 5 | 6 | 7 | 8 | 9*3 | 10*3 | 11*3 | 12*3 |
|---|---|---|---|---|---|---|---|---|---|---|---|---|
| Fluorination | | | | | | | | | | | | |
| Solvent | $CH_2Cl_2$ | $CH_2Cl_2$ | $CH_2Cl_2$ | *1 | *1 | none | $CH_2Cl_2$ | $CH_2Cl_2$ | $CH_2Cl_2$ | $CH_2Cl_2$ | $CH_2Cl_2$ | $CH_2Cl_2$ |
| $SCl_2$ mol (A) | 0.2 | 0.2 | 0.2 | 0.2 | 0.2 | 0.2 | 0.2 | 0.2 | 0.2 | 0.2 | 0.2 | 0.2 |
| HF/Py (molar ratio) | 3 | 2 | 4 | 2 | 3 | 4 | 2 | 3 | 4 | 3 | 3 | 3 |
| $Py.(HF)_n$ mol (B) | 0.92 | 0.92 | 0.92 | 0.6 | 0.6 | 0.6 | 0.3 | 0.3 | 0.3 | 0.92 | 0.2 | 0.1 |
| (B)/(A) | 4.6 | 4.6 | 4.6 | 3 | 3 | 3 | 1.5 | 1.5 | 1.5 | 4.6 | 1.0 | 0.5 |
| $\frac{(B)/(A)}{HF/Py}$ (molar ratio) | 1.53 | 2.3 | 1.15 | 1.5 | 1 | 0.75 | 0.75 | 0.5 | 0.375 | 1.53 | 0.33 | 0.17 |
| Reaction temp. (°C.) | 30 | 40 | 40 | 30 | 40 | 40 | 40 | 40 | 40 | −10 | 30 | 30 |
| Reaction time (hr.) | 3 | 3 | 3 | 3 | 3 | 3 | 3 | 3 | 3 | 3 | 3 | 3 |
| Yield (%) | 90 | 89 | 70 | 89 | 84 | 53 | 84 | 59 | 27 | 5 | 15 | 4 |
| HCl exchange reaction | | | | | | | | | | | | |
| Equivalent of HF to Py.HCl (m) | 8 | 8 | 8 | 8 | 8 | 8 | 8 | 8 | 8 | —*2 | —*2 | —*2 |
| Yield of $Py.(HF)_m$ | 100 | 100 | 100 | 100 | 100 | 100 | 100 | 100 | 100 | — | — | — |
| HF separation | | | | | | | | | | | | |
| Use of NaF | none | none | NaF | none | none | none | none | none | NaF | — | — | — |
| Yield (%) | 100 | 100 | 100 | 100 | 100 | 100 | 100 | 100 | 100 | — | — | — |
| Recovered $Py.(HF)_n$ (n) | 3 | 3 | 2 | 3 | 3 | 2 | 3 | 3 | 2 | — | — | — |

TABLE 2

| Test | 13 | 14 | 15 | 16 | 17 |
|---|---|---|---|---|---|
| Fluorination | | | | | |
| Solvent Kind | $C_2Cl_3F_3$ | $C_2Cl_3F_3$ | $C_2Cl_3F_3$ | *4 | *5 |
| Amount (1) | 0.5 | 0.5 | 0.4 | | |
| $SCl_2$ mol (A) | 1 | 1 | 1 | 1 | 1 |
| Am | | | | | |
| HF/Am (molar ratio) | QIL 2 | QIL 4 | α-PIL 3 | Py 3 | Py 4 |
| $Am.(HF)_n$ mol (B) | 2 | 6 | 4 | 5.4 | 6.8 |
| (B)/(A) | 2 | 6 | 4 | 5.4 | 6.8 |
| $\frac{(B)/(A)}{HF/Am}$ (molar ratio) | 1 | 1.5 | 1.33 | 1.8 | 1.7 |
| Reaction temp. (°C.) | 40 | 40 | 40 | 40 | 40 |
| Reaction time (hr.) | 3 | 3 | 3 | 3 | 3 |
| Yield (%) | 94 | 90 | 91 | 92.5 | 91.0 |

Quinoline: QIL
α-picoline: α-PIL
Triethylamine: TEA
Pyridine: Py

TABLE 3

| Test | 18 | 19 | 20 | 21 | 22 | 23 | 24 |
|---|---|---|---|---|---|---|---|
| Fluorination | | | | | | | |
| Solvent | | | | | | | |
| Kind | $C_2Cl_3F_3$ | $C_2Cl_3F_3$ | *6 | *6 | $C_2Cl_3F_3$ | $C_2Cl_3F_3$ | $C_2Cl_3F_3$ |
| Amount (1) | 0.6 | 0.5 | 0.6 | 0.6 | 0.5 | 0.6 | 0.5 |
| $S_2Cl_2$ mol (A) | 1 | 1 | 1 | 1 | 1 | 1*7 | 1*7 |
| $Cl_2$ mol | 1 | 2 | 1 | 1 | 1 | 2 | 2 |
| Am | | | | | | | |
| HF/Am | Py | Py | Py | QIL | α-PIL | QIL | Py |
| (molar ratio) | 2 | 3 | 3 | 3 | 2 | 3 | 3 |
| $Am(HF)_n$ | 4 | 6 | 6 | 6 | 4 | 3 | 3 |
| mol (B) | | | | | | | |
| (B)/2(A) | 2 | 3 | 3 | 3 | 2 | 1.5 | 1.5 |
| $\dfrac{(B)/2(A)}{HF/Am}$ (molar ratio) | 1 | 1 | 1 | 1 | 1 | 0.5 | 0.5 |
| Reaction temp. (°C.) | 40 | 40 | 40 | 40 | 40 | 40 | 40 |
| Reaction time (hr.) | 3 | 3 | 3 | 3 | 3 | 3 | 3 |
| Yield (%) | 93 | 95 | 92 | 93 | 91 | 92 | 93 |

TABLE 4

| Test | 25*3 | 26*3 | 27*3 |
|---|---|---|---|
| Fluorination | | | |
| Solvent | $CH_2Cl_2$ | *4 | $CH_2Cl_2$ |
| S mol (A) | — | — | 1 |
| $S_2Cl_2$ mol (A') | 0.5 | 0.5 | — |
| $Cl_2$ mol | 0.5 | 0.5 | 1 |
| HF/Py (molar ratio) | 1 | 1 | 1 |
| $Py.(HF)_n$ mol (B) | 3 | 3 | 4 |
| (B)/(A) or (B)/2(A') | 3 | 3 | 4 |
| $\dfrac{(B)/(A) \text{ or } (B)/2(A')}{HF/Py}$ (molar ratio) | 3 | 3 | 4 |
| Reaction temp. (°C.) | 30 | 40 | 30 |
| Reaction time (hr.) | 3 | 3 | 3 |
| Yield (%) | 9 | 11 | 5 |
| HCl exchange reaction | | | |
| Equivalent of HF to Py.HCl (m) | —*2 | —*2 | —*2 |
| Yield of $Py.(HF)_m$ (%) | — | — | — |
| HF separation | | | |
| Use of NaF | — | — | — |
| Yield (%) | — | — | — |
| Recovered $Py.(HF)_n$ (n) | — | — | — |
| Remarks | *8 | *8 | *8 |

Note:
*1    The mixed solvent of $CH_2Cl_2$ and $CCl_2.FCClF_2$ at a molar ratio of 1:1.
*2    No test was carried out for the exchange of HCl and the following step because of low yield.
*3    References
*4    The mixed solvent of 30 mol % of $CH_2Cl_2$ and 70 mol % of $CCl_2.FCClF_2$ (0.58 liter).
*5    The mixed solvent of 60 mol % of $CH_2Cl_2$ and 40 mol % of $CCl_2.FCClF_2$ (0.54 liter).
*6    The mixed solvent of 0.3 liter of $CH_2Cl_2$ and 0.3 liter of $CCl_2.FCClF_2$.
*7    Sulfur chloride was produced by suspending sulfur powder in a solvent and feeding chlorine in the presence of iodine at a concentration of 200 ppm.
*8    A tar-like slurry was formed by the reaction of Py.(HF) complex with chlorine, and the yield of sulfur tetrafluoride was poor. No further HCl reaction or HF -continued Note:
separation was carried out.

We claim:

1. A process for producing sulfur tetrafluoride which comprises reacting in the absence or presence of a solvent an amine/hydrogen fluoride complex having the formula:

$$Am.(HF)_n$$

wherein Am represents an amine selected from the group consisting of nitrogen-containing heterocyclic aromatic amines and derivatives thereof, and n represents 2–4, with sulfur dichloride, sulfur monochloride or a combination of chlorine and sulfur at a temperature of 0° to 60° C., the molar ratio of said amine/hydrogen fluoride complex to said sulfur dichloride, sulfur monochloride or sulfur being represented by the formula:

$$\frac{B}{n \times A} > 0.5$$

wherein n is as defined above, A represents moles of sulfur in said sulfur dichloride, sulfur monochloride or sulfur, and B represents moles of said amine/hydrogen fluoride complex.

2. The process for producing sulfur tetrafluoride according to claim 1 wherein said solvent is an organic solvent inert to the reagents in the reaction system.

3. The process for producing sulfur tetrafluoride according to claim 2 wherein said organic solvent is a halogenated hydrocarbon.

4. The process for producing sulfur tetrafluoride according to claim 3 wherein said halogenated hydrocarbon is at least one of compounds selected from the group consisting of methylene chloride, trichlorotrifluoroethane, fluorotrichloromethane, chloroform and carbon tetrachloride.

5. The process for producing sulfur tetrafluoride according to claim 4 wherein said halogenated hydrocarbon is a mixture of methylene chloride and trichlorotrifluoroethane.

6. The process for producing sulfur tetrafluoride according to claim 5 wherein a ratio of methylene chloride to trichlorotrifluoroethane is in a range of 20 to 80 mol % of methylene chloride and 80 to 20 mol % of trichlorotrifluoroethane.

7. The process for producing sulfur tetrafluoride according to claim 1, 2, 3, 4, 5 or 6 wherein an amount of said solvent is in a range of 10 to 200 vol. % based on the total of said solvent and said reagents.

8. The process for producing sulfur tetrafluoride according to claim 1 wherein said amine is pyridine.

9. The process for producing sulfur tetrafluoride according to claim 1 wherein said amine is picoline, quinoline.

10. The process for producing sulfur tetrafluoride according to claim 1 wherein the ratio represented by $$\frac{B}{n \times A}$$

is not less than 1.

* * * * *